(12) United States Patent
Meller et al.

(10) Patent No.: US 9,455,665 B1
(45) Date of Patent: Sep. 27, 2016

(54) SOLAR TRACKER CLEANING SYSTEM AND METHOD

(71) Applicant: Ecoppia Scientific Ltd., Herzliya (IL)

(72) Inventors: Moshe Meller, Tel Aviv (IL); Eran Meller, Tel Aviv (IL)

(73) Assignee: Ecoppia Scientific Ltd., Herzliya (IL)

( * ) Notice: Subject to any disclaimer, the term of this patent is extended or adjusted under 35 U.S.C. 154(b) by 0 days.

(21) Appl. No.: 15/005,139

(22) Filed: Jan. 25, 2016

Related U.S. Application Data

(60) Provisional application No. 62/252,519, filed on Nov. 8, 2015.

(51) Int. Cl.
*A47L 5/22* (2006.01)
*H02S 40/10* (2014.01)
*H02S 30/10* (2014.01)

(52) U.S. Cl.
CPC ............... *H02S 40/10* (2014.12); *H02S 20/32* (2014.12); *H02S 30/10* (2014.12)

(58) Field of Classification Search
CPC ......... H02S 40/10; H02S 20/32; H02S 30/10

IPC .......................................................... A47L 5/22
See application file for complete search history.

(56) References Cited

U.S. PATENT DOCUMENTS 8,771,432 B2    7/2014   Meller et al.

*Primary Examiner* — David Redding
(74) *Attorney, Agent, or Firm* — Brown Rudnick LLP

(57) ABSTRACT

A solar tracker waterless cleaning system for cleaning solar panels of solar trackers in at least one solar tracker row, each solar tracker having a length and a width and being able to be positioned at a pre-determined angle, the cleaning system including at least one waterless cleaning apparatus operable to clean a panel surface of the solar tracker row without using water, at least two rails positioned horizontally parallel to the solar tracker row, a support frame for supporting the cleaning apparatus and a controller coupled with the cleaning apparatus and with the support frame for moving the cleaning apparatus in the width direction and the length direction of the solar tracker row, the support frame moving over the rails and moving the cleaning apparatus in a width direction and a length direction of the solar tracker row while maintaining a pre-determined angle in the width direction of the solar trackers.

11 Claims, 9 Drawing Sheets

SOLAR TRACKER CLEANING SYSTEM AND METHOD

RELATED APPLICATIONS

This application claims the benefit of U.S. Provisional Application No. 62/252,519, filed Nov. 8, 2015.

FIELD OF THE DISCLOSED TECHNIQUE

The disclosed technique relates to solar trackers, in general, and to methods and systems for cleaning solar trackers without water, in particular.

BACKGROUND OF THE DISCLOSED TECHNIQUE

The challenges of global climate change and energy circuitry demands have made the development of renewable energy alternatives vital for the future of mankind. The use of direct sun radiation on solar panels can potentially produce more than enough energy to meet the energy needs of the entire planet. As the price of solar power decreases and the pollution caused by conventional fuels is rising, the solar business has entered a new era of worldwide growth.

In order to bring technologies to exploit solar energy one step closer up to par with conventional fuels, the efficiency rate of solar systems must improve. Solar panel efficiency depends amongst other things on the cleanliness of their surface. Energy losses caused by dust and soiling can reach over 40%. In desert areas, where many solar parks are located, the soiling and dust problem is significant.

A fast growing type of solar park is the solar tracker park. The solar trackers (herein referred to as simply trackers) have the ability to follow the sun's position continuously from morning to evening by changing their tilt angle from east (in the morning) to west (in the evening) in order to increase efficiency. Currently there is no automatic cleaning solution for solar trackers. Cleaning is done manually; it is thus labor intensive and also consumes a high volume of water.

SUMMARY OF THE PRESENT DISCLOSED TECHNIQUE

It is an object of the disclosed technique to provide a novel method and system for cleaning solar trackers automatically, efficiently and without using water. Another object of the disclosed technique is to provide such a system and a method which is economical to install and to operate.

In accordance with the disclosed technique, there is thus provided a solar tracker waterless cleaning system for cleaning solar panels of solar trackers in at least one solar tracker row. The solar tracker row includes a plurality of solar trackers, each solar tracker having a length and a width and being able to be positioned at a pre-determined angle. The waterless cleaning system includes at least one waterless cleaning apparatus, at least two rails, a support frame and a controller. The waterless cleaning apparatus is operable to clean the surface of solar panels of the solar tracker row without using water. The rails are positioned horizontally parallel to the solar tracker row. The support frame is for supporting the waterless cleaning apparatus. The support frame moves over the rails and moves the waterless cleaning apparatus in a width direction and a length direction of the solar tracker row while maintaining a pre-determined angle in the width direction of the solar trackers. The controller is coupled with the waterless cleaning apparatus and with the support frame. The controller is for moving the waterless cleaning apparatus in the width direction and the length direction of the solar tracker row, thereby causing the waterless cleaning apparatus to clean the surface of the solar panels while moving downwards in the width direction of the solar trackers.

The waterless cleaning apparatus includes at least one air stream generating apparatus for creating a directional air stream in the width direction of the solar tracker row. The directional air stream pushes dust particles from the surface of the solar panels downwards and off the solar panels of the solar trackers. The air stream generating apparatus includes a plurality of flexible microfiber fins that move in the direction of the directional air stream and touch the surface of the solar panels to enhance a cleaning of the surface of the solar panels without using water.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a novel method and system for cleaning solar trackers automatically, efficiently and without using water. In addition, the disclosed techniques provides for a system and a method which is economical to install and to operate. It is noted that identical reference numbers are used throughout the figures to refer to identical elements in different figures.

Figure 1:
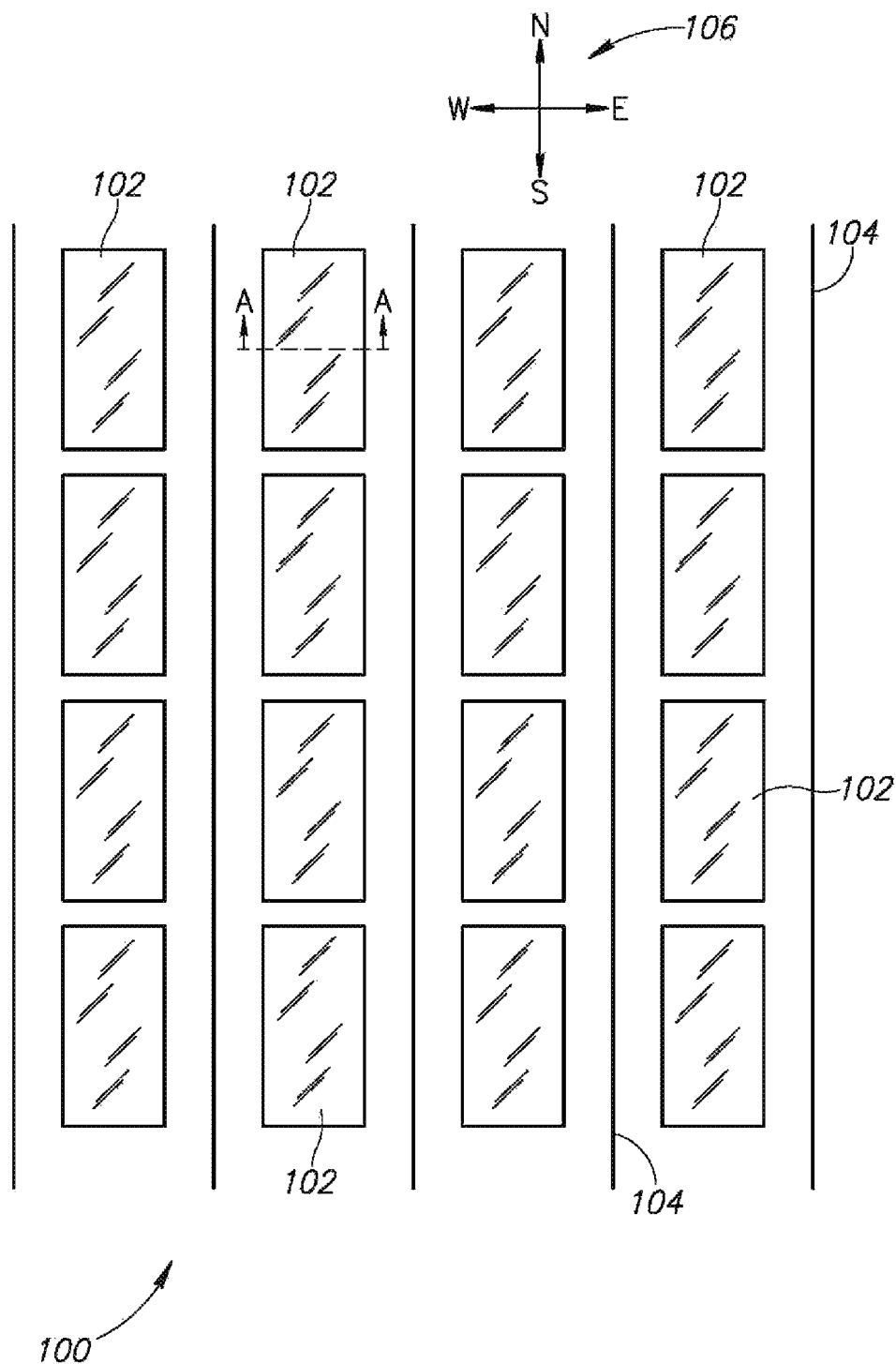
FIG. 1 is a top view of a solar tracker park, constructed and operative in accordance with an embodiment of the disclosed technique.

Reference is now made to FIG. 1, which is a top view of a solar tracker park, generally referenced 100, constructed and operative in accordance with an embodiment of the disclosed technique. Solar tracker park 100 includes a plurality of solar trackers 102 arranged in rows and a plurality of rails 104 that pass between neighboring rows of solar trackers. Each solar tracker 102 includes a plurality of solar panels (not labeled). It is noted that plurality of rails 104 is part of the system of the disclosed technique and that the cleaning system of the disclosed technique moves along two or more of plurality of rails 104 along each row of solar trackers, as described in further detail below in FIGS. 4 and 5. Cardinal direction arrows 106 show the position of the solar tracker rows relative to north. Each one of plurality of solar trackers 102 is positioned horizontally in a north-south direction, with the tilt of each solar tracker being continuously changed from east (in the morning) to west (in the evening) in order to maximize the absorption of radiation from the sun (not shown).

Figure 2:
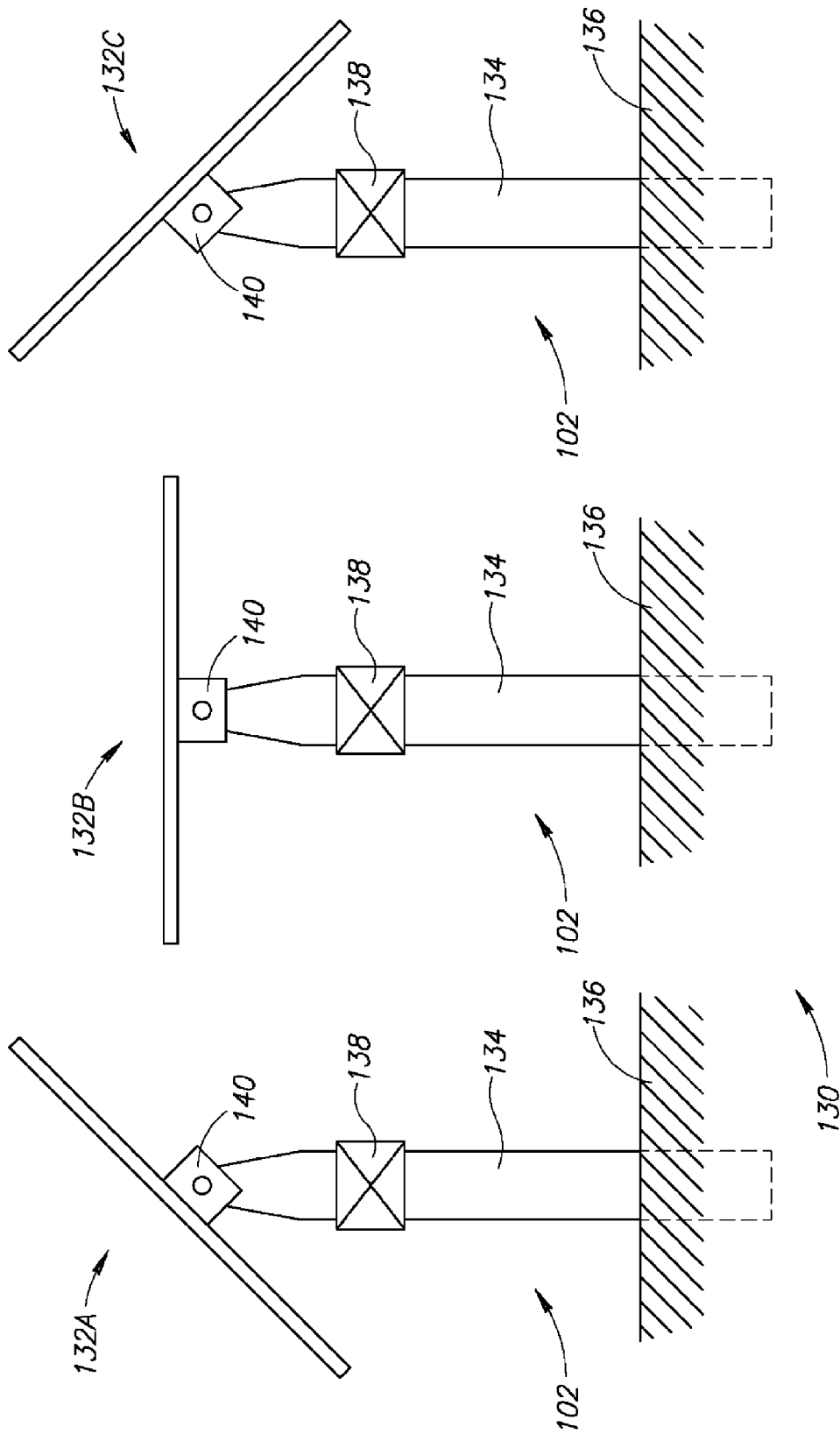
FIG. 2 is a side view of a single tracker at morning, noon and evening hours, constructed and operative in accordance with another embodiment of the disclosed technique.

Reference is now made to FIG. 2, is a side view of a single tracker at morning, noon and evening hours, generally referenced 130, constructed and operative in accordance with another embodiment of the disclosed technique. FIG. 2 shows three positions of a single solar tracker. Arrow 132A points to the morning position (which is eastward), arrow 132B points to the horizontal noon position and arrow 132C points to the evening position (which is westward). A drive mechanism 138 is the mechanism that drives the angle change of the solar tracker. There are many types of drive mechanisms and they will not be described herein. A main shaft 140 is the main shaft that allows the angle change of the solar tracker. A pole 134 is the pole that supports the solar tracker above the ground, as shown by reference 136.

Figure 3:
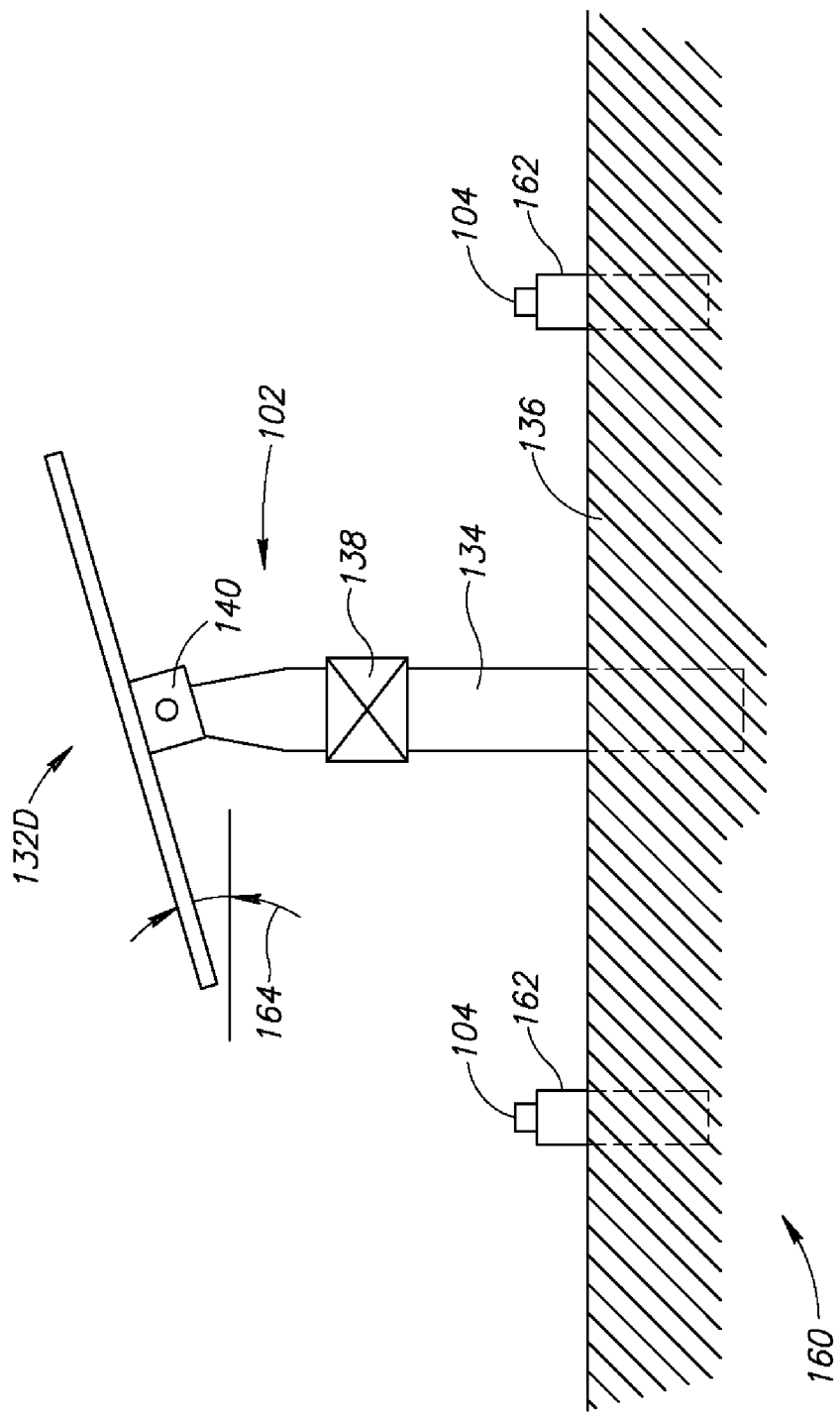
FIG. 3 is a side view of a single tracker positioned at a cleaning angle, constructed and operative in accordance with a further embodiment of the disclosed technique.

Reference is now made to FIG. 3, which is a side view of a single solar tracker positioned at a cleaning angle, generally referenced 160, constructed and operative in accordance with a further embodiment of the disclosed technique. The cleaning angle is shown as angle 164 and is a pre-determined angle. Cleaning angle 164 is the angle at which the system of the disclosed technique operates at. Solar tracker 102 is shown at a cleaning position 132D. Reference 104 represents the plurality of rails already described above in FIG. 1 and reference 162 refers to the bases of the plurality of rails. Bases 162 allow accurate positioning of plurality of rails 104 vertically and horizontally.

Figure 4:
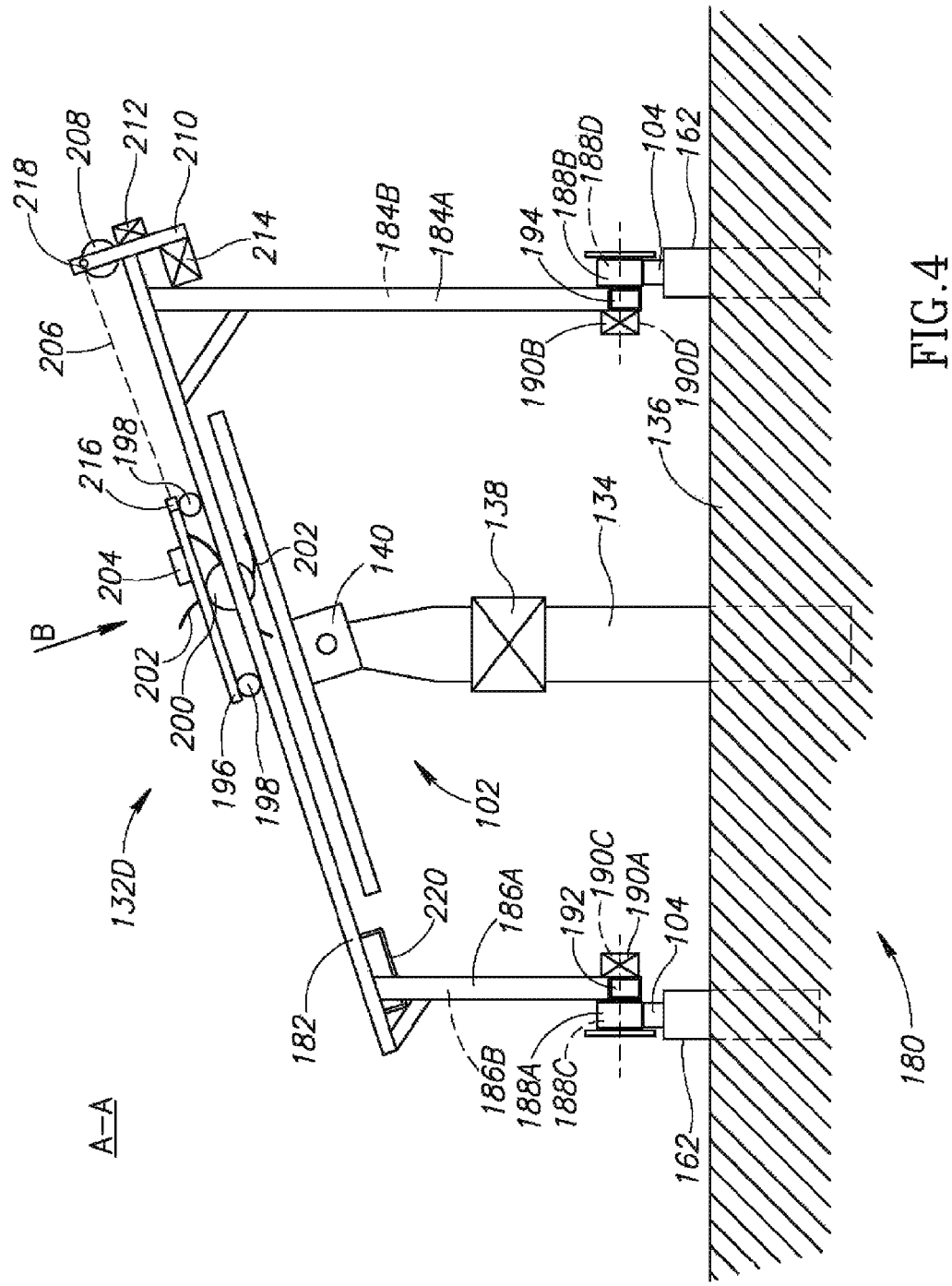
FIG. 4 is a side view along line A-A of FIG. 1 showing the system of the disclosed technique while cleaning a solar tracker, constructed and operative in accordance with another embodiment of the disclosed technique.

Reference is now made to FIG. 4, which is a side view along line A-A of FIG. 1 showing the system of the disclosed technique while cleaning a solar tracker, generally referenced 180, constructed and operative in accordance with another embodiment of the disclosed technique. Solar tracker 102 is positioned at cleaning angle 164 (FIG. 3) in cleaning position 132D. System 180 includes a main frame 182, preferably made from aluminum profiles, which is supported by two longer poles 184A and 184B (not visible) and two shorter poles 186A and 186B (not visible). The difference in the length between longer poles 184A and 184B and shorter poles 186A and 186B positions system 180 at cleaning angle 164, which is pre-determined. In cleaning position 132D main frame 182 is parallel to solar tracker 102. System 180 also includes four wheels 188A-188D (only two are visible in FIG. 4) over which system 180 moves along a solar tracker row on plurality of rails 104, as well as four respective motor transmissions 190A-190D (only two are visible in FIG. 4) that respectively drive wheels 188A-188D. In one embodiment system 180 includes four motor transmissions 190A-190D, however system 180 may include other numbers of motor transmissions in other embodiments. Motor transmissions 190A-190D can be DC motors.

System 180 further includes a cleaning carriage 196 which is movable along main frame 182, which itself includes a rotating cylinder 200. A plurality of microfiber fins 202 are coupled to rotating cylinder 200. Plurality of microfiber fins 202 is flexible. Cleaning carriage 196, rotating cylinder 200 and plurality of microfiber fins 202 together form a waterless cleaning apparatus for cleaning a surface of the solar panels. The rotation of plurality of microfiber fins 202 generates a downward air stream along solar tracker 102 in the width direction. The movement of the plurality of microfiber fins creates a directional air stream for pushing dust particles off the surface of the solar panels of solar tracker 102. The combined forces of the generated air stream, gravity and the soft touch of plurality of microfiber fins 202 cleans the surface of the solar tracker without using water. Rotating cylinder 200 is driven by a DC motor 204. It is noted that other types of motors can be used to drive rotating cylinder 200. A plurality of wheels 198 is also included on which cleaning carriage 196 moves along main frame 182. Isolated metal cables 206 drive cleaning carriage 196 along main frame 182. Isolated metal cables 206 also conduct electricity to DC motor 204.

System 180 further includes a rotating drum 208 that winds and unwinds isolated metal cables 206. A frame 210 holds rotating drum 208. A DC motor and transmission 212 is coupled with frame 210 and drives rotating drum 208. A control unit 214 controls system 180. Control unit 214 includes a power supply, such as rechargeable batteries (not shown), for powering system 180. Control unit 214 includes a programmable logic controller (herein abbreviated PLC) and rechargeable batteries. System 180 also includes a solar panel 220 for charging the batteries of system 180 during daytime. Solar panel 220 and the rechargeable batteries make system 180 fully autonomous energy wise.

Figure 5:
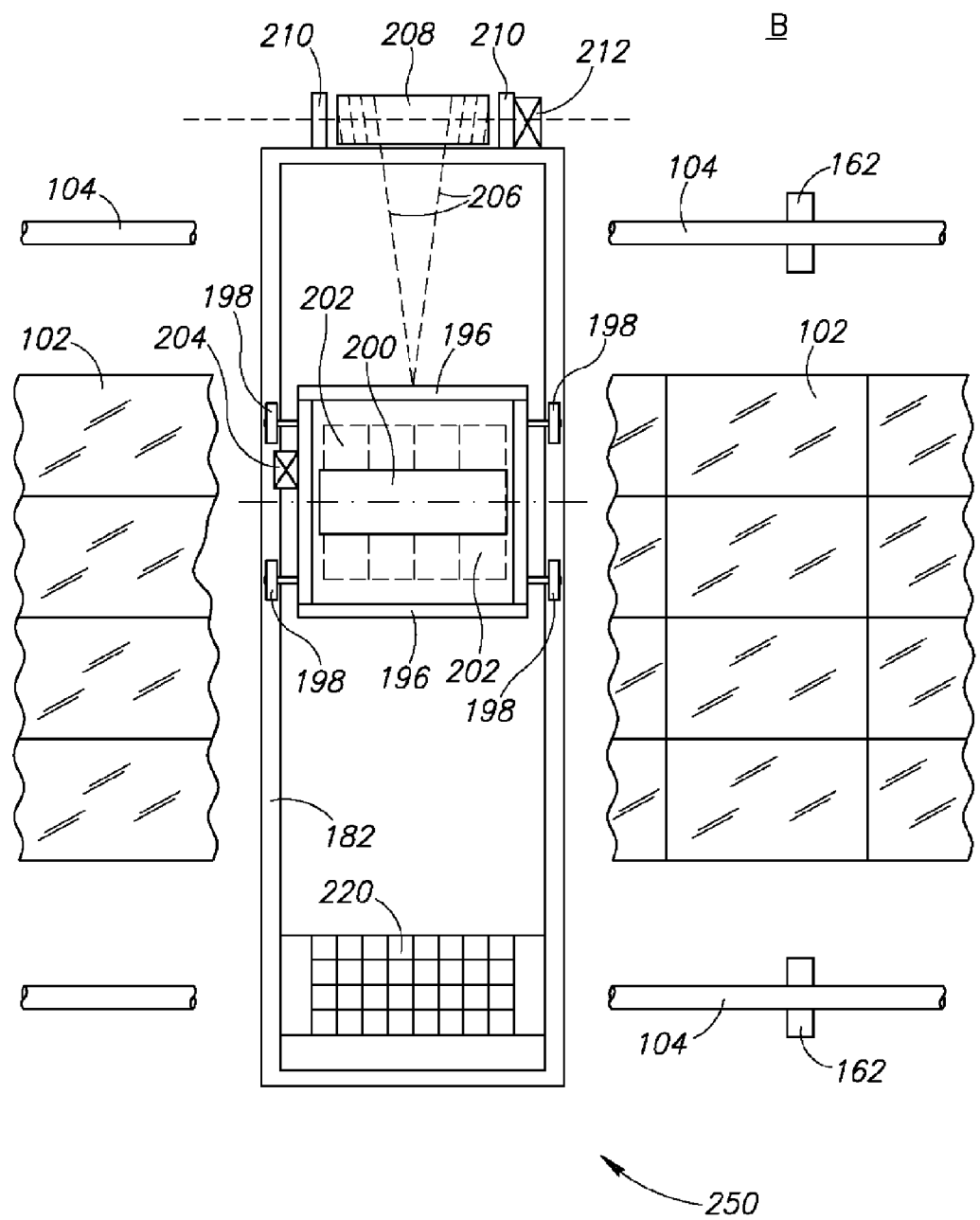
FIG. 5 is a top view of the system in the direction of arrow B of FIG. 4, constructed and operative in accordance with a further embodiment of the disclosed technique.

Reference is now made to FIG. 5, which is a top view of the system in the direction of arrow B of FIG. 4, generally referenced 250, constructed and operative in accordance with a further embodiment of the disclosed technique. Elements explained in FIG. 4 will not be described again. In particular, FIG. 5 shows that isolated metal cables 206 includes two cables which are coupled with rotating drum 208. The angular arrangement as shown between the two isolated metal cables allows for an orderly winding on rotating drum 208.

Figure 6:
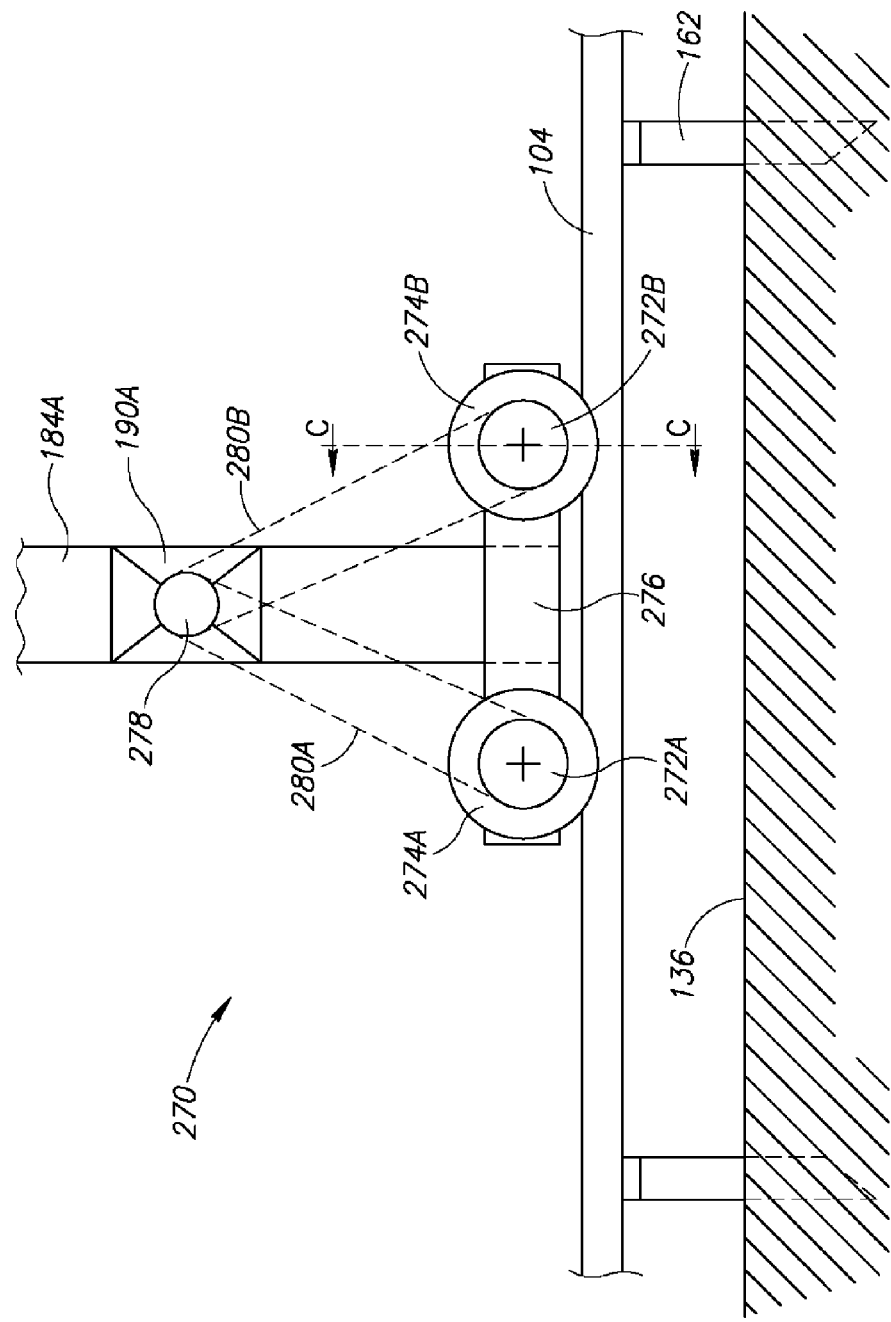
FIG. 6 is an embodiment of a drive mechanism enabling the system of FIG. 4 to cross gaps in the rails of the system, constructed and operative in accordance with another embodiment of the disclosed technique.
Figure 7:
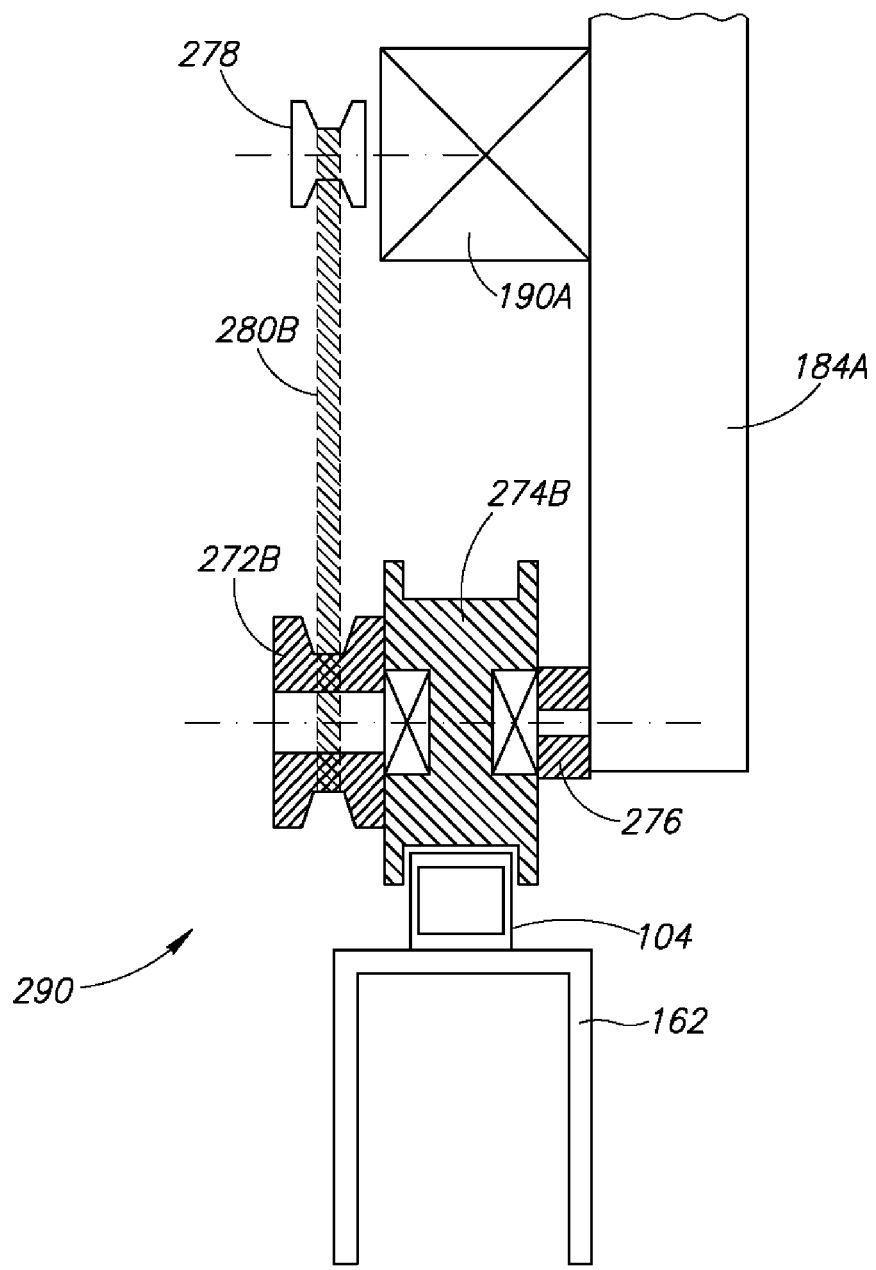
FIG. 7 is a cross-sectional view along line C-C of FIG. 6, constructed and operative in accordance with a further embodiment of the disclosed technique.

Reference is now made to FIGS. 6 and 7. FIG. 6 is an embodiment of a drive mechanism enabling the system of FIG. 4 to cross gaps in the rails of the system, generally referenced 270, constructed and operative in accordance with another embodiment of the disclosed technique. This embodiment of the drive mechanism enables system 180 (FIG. 4) to cross gaps in plurality of rails 104. These gaps might be necessary in some solar tracker parks. Drive mechanism 270 includes a pulley 278 that is driven by motor transmission 190A. Pulley 278 transmits its rotation to two wheels 274A and 274B through two belts 280A and 280B and two pulleys 272A and 272B. Two wheels 274A and 274B are coupled to a metal element 276. Metal element 276 supports two wheels 274A and 274B and is connected to longer pole 184A, shorter pole 186A (not shown) or both. FIG. 6 shows a side view whereas FIG. 7 is a cross-sectional view along line C-C of FIG. 6, generally referenced 290, constructed and operative in accordance with a further embodiment of the disclosed technique. FIG. 7 shows in detail drive mechanism 270 (FIG. 6) of system 180.

Figure 8:
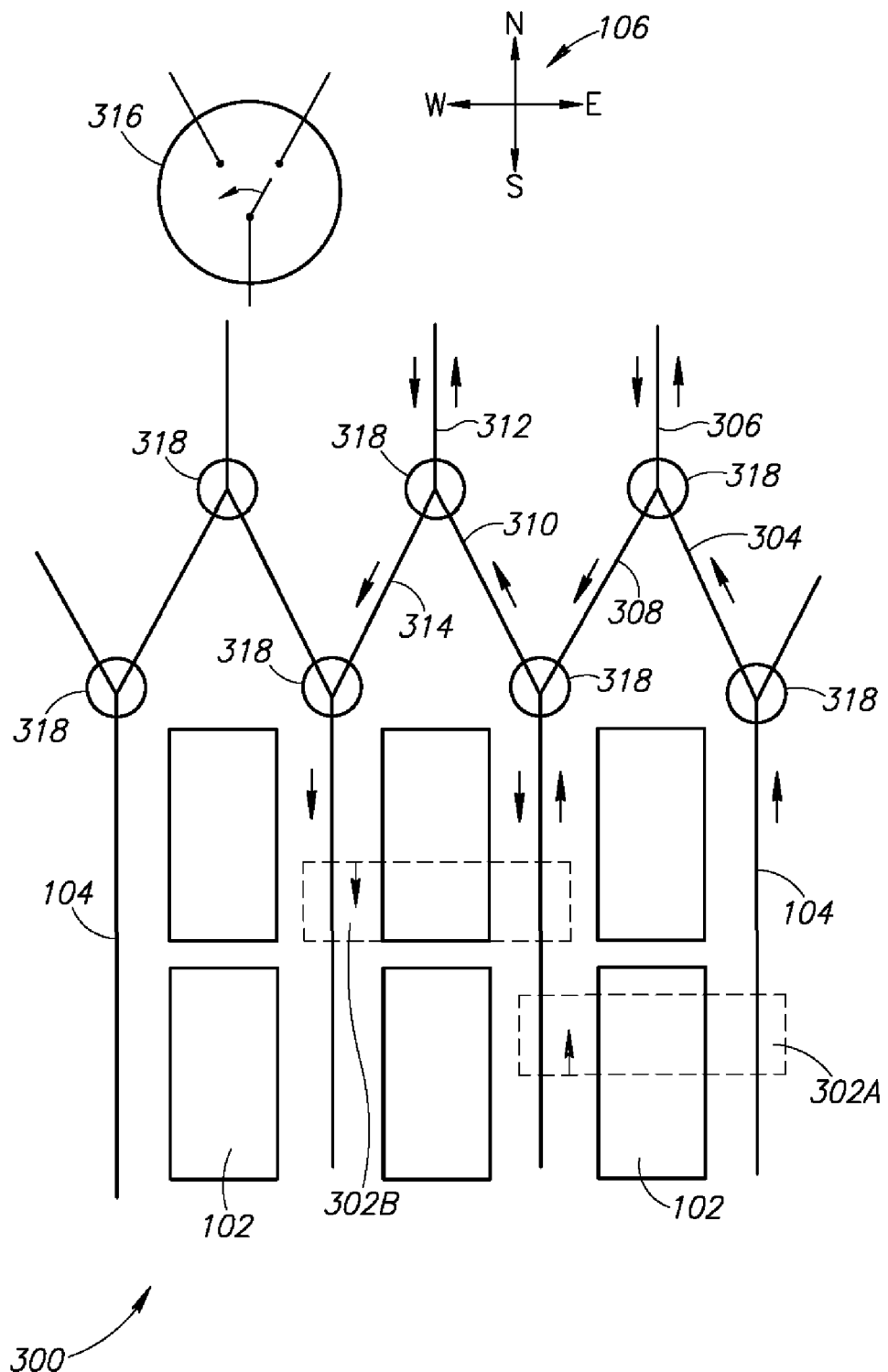
FIG. 8 is top view showing an embodiment of a rail arrangement of the system of the disclosed technique enabling multiple solar tracker rows to be cleaned with a single system, constructed and operative in accordance with another embodiment of the disclosed technique.

Reference is now made to FIG. 8, which is a top view showing an embodiment of a rail arrangement of the system of the disclosed technique enabling multiple solar tracker rows to be cleaned with a single system, generally referenced 300, constructed and operative in accordance with another embodiment of the disclosed technique. Rail arrangement 300 enables the system to switch from one solar tracker row to another one. A plurality of solar trackers 102 is shown along with a plurality of rails 104 on which system 180 (FIG. 4) moves along a solar tracker row. Shown as well are a plurality of rails segments 304, 306, 308, 310, 312 and 314 that allow system 180 to switch solar tracker rows. A plurality of rail switching points 318 is shown which is a well-known mechanism taken from the railroad industry, shown in detail as rail switching point 316. This will not be described in detail. System 180 of the disclosed technique is shown in two locations, a first location 302A and a second location 302B. The switching process is as follows: system 180 is in first location 302A in the easterly solar tracker row and moves toward the first line of rail switching points 318 of rail arrangement 300. System 180 is then directed to rail segments 304 and 310. At the second line of rail switching points 318, system 180 is then directed to rail segments 306 and 312. System 180 is then stopped and changes direction thus moving backwards. At the second line of rail switching points 318, system 180 is directed to rail segments 308 and 314 and at the next line of rail switching points 318, system 180 is directed to a second solar tracker row. The switching process is thus complete as shown by system 180 being in second location 302B. The possibility of cleaning a plurality of solar tracker rows with a single system makes the solution of the disclosed technique more economical. In both cases of operation, i.e. a system for every solar tracker row or a single system for a plurality of solar tracker rows, it is important to position the plurality of rails exactly in the middle between any two solar tracker rows in order to achieve an equal distance between the plurality of rails which allows at least two systems, one after the other, to drive on the same rail.

Figure 9:
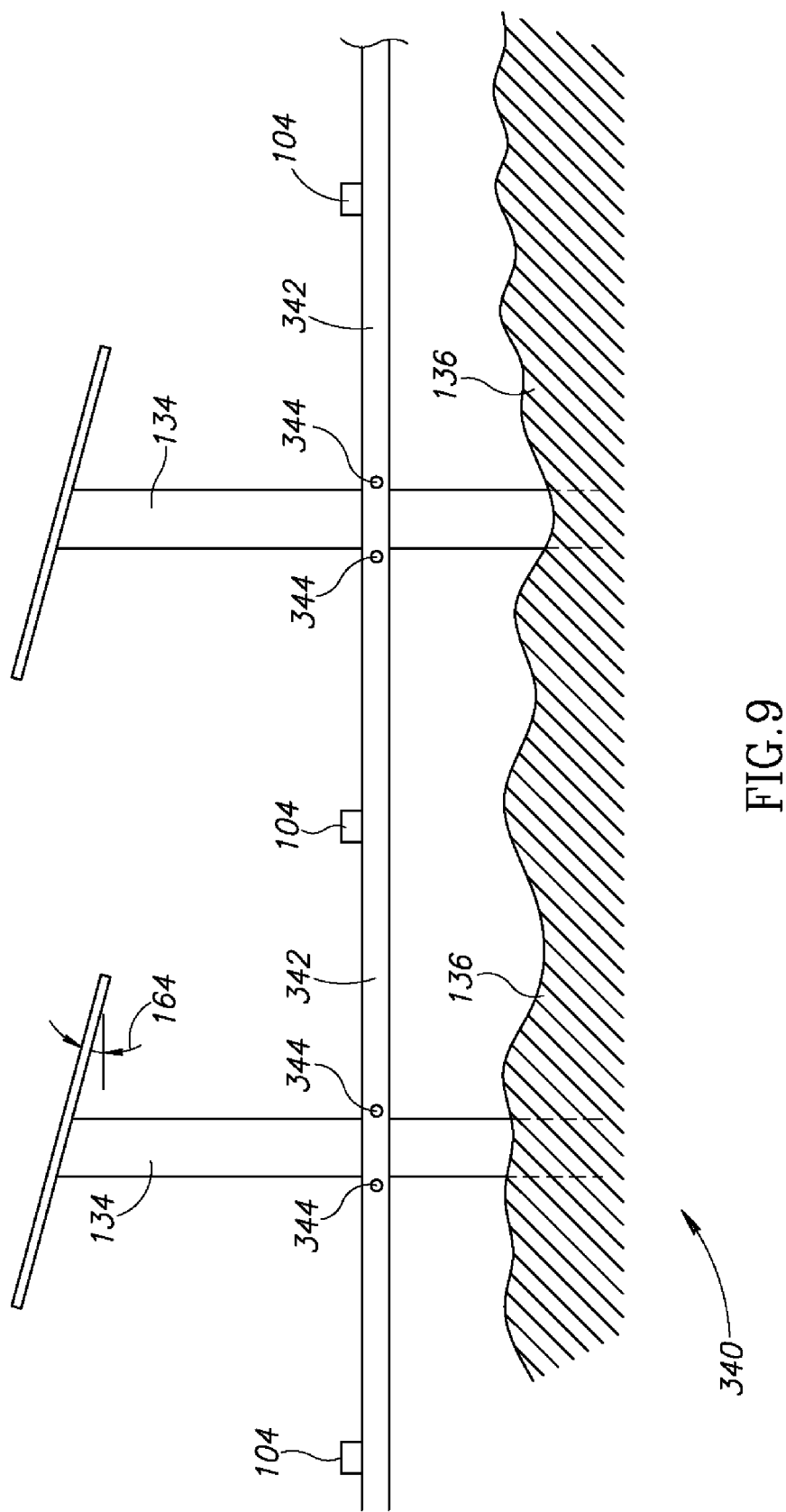
FIG. 9 is a side view of a rail arrangement for leveling the system of the disclosed technique, constructed and operative in accordance with a further embodiment of the disclosed technique.

Reference is now made to FIG. 9, which is a side view of a rail arrangement for leveling the system of the disclosed technique, generally referenced 340, constructed and operative in accordance with a further embodiment of the disclosed technique. In this rail arrangement, plurality of rails 104 are not coupled with bases, as shown above in FIG. 4, but rather are coupled with a second plurality of rails 342, running perpendicular to plurality of rails 104. Second plurality of rails 342 are coupled with poles 134 of each solar tracker via attachments 344.

Description of the System Sensors and Control

With reference back to FIG. 4, system 180 has four sensors that can read and transmit the position of system 180 and its elements to control unit 214. It is noted that more or fewer sensors can be used. These sensors are a first sensor 216, a second sensor 218, a third sensor 194 and a fourth sensor 192. First sensor 216 is an up limit sensor that gives a signal when cleaning carriage 196 is in its up position. Second sensor 218 is an encoder that counts the number of rotations of rotating drum 208. Second sensor 218 gives a signal every ⅓ rotation of rotating drum 208. It is noted that other ratios can be used. The signals read from second sensor 218 allows control unit 214 to analyze the position of cleaning carriage 196 along main frame 182. Third sensor 194 is an encoder that counts the rotation of one of either wheels 188A-188D or motor transmissions 190A-190D. Third sensor 194 gives a signal every ⅓ rotation of either the wheels or the motor transmissions. As mentioned above, other ratios can be used. The signals read from third sensor 194 enable control unit 214 to analyze the position of system 180 along the plurality of rails of the solar tracker row. Fourth sensor 192 is an end switch of the position of system 180. Fourth sensor 192 is coupled with either one of long poles 184A and 184B or short poles 186A and 186B and gives a signal when system 180 reaches any end of plurality of rails 104. The specific locations of first sensor 216, second sensor 218, third sensor 194 and fourth sensor 192 are marked and shown in FIG. 4.

Description of Operation

Reference is made to FIGS. 4 and 5. When at rest, system 180 parks on plurality of rails 104 out of a solar tracker row in a way that there is no mechanical interaction or shadowing between system 180 and the solar tracker row. Before the cleaning of a solar tracker row starts, the solar tracker row is brought to cleaning position 132D at cleaning angle 164. The cleaning process can be initiated manually or by a transmission command. These possibilities are integrated as part of control unit 214. When cleaning starts, system 180 moves to a pre-determined distance toward the solar tracker row as measured by third sensor 194. Cleaning carriage 196 moves upward until stopped by first sensor 216. DC motor 204 starts to rotate rotating cylinder 200 and cleaning carriage 196 starts descending downwards. The generated air stream, the soft touch of plurality of microfiber fins 202 combined with the force of gravity clean the surface of the solar tracker, thus cleaning the surface of the solar panels of the solar tracker. When cleaning carriage 196 reaches a pre-determined distance, measured by second sensor 218 along main frame 182, the rotation of rotating cylinder 200 is stopped. Once the descent of cleaning carriage 196 has stopped, motors transmissions 190A-190D start and rotate wheels 188A-188D on plurality of rails 104. System 180 will move a pre-determined distance, measured by third sensor 194, over plurality of rails 104 along a solar tracker row. This pre-determined distance, also referred to as a horizontal movement along the solar tracker row is a little shorter than the length of rotating cylinder 200 in order to create an overlap between cleaning cycles. When the horizontal movement of system 180 is complete, motor transmissions 190A-190D stop, DC motor and transmission 212 starts and initiates an upwards movement of cleaning carriage 196 that is pulled by isolated metal cables 206 which are wound around rotating drum 208. When cleaning carriage 196 reaches its up limit, as determined by first sensor 216, DC motor and transmission 212 stops and a new cleaning cycle is started. The cleaning cycles will continue until system 180 reaches the far end of the solar tracker row. Cleaning is then stopped and system 180 will move back over plurality of rails 104 to a parking station at a start point. It is also possible that system 180 will park at the far end of the solar tracker row. In this case the next cleaning cycle will start from the far end of the solar tracker row.

It will be appreciated by persons skilled in the art that the disclosed technique is not limited to what has been particularly shown and described hereinabove. Rather the scope of the disclosed technique is defined only by the claims, which follow.

The invention claimed is:

1. A solar tracker waterless cleaning system for cleaning solar panels of solar trackers in at least one solar tracker row, said solar tracker row comprising a plurality of solar trackers, each said solar tracker having a length and a width and being able to be positioned at a pre-determined angle, said waterless cleaning system comprising:

at least one waterless cleaning apparatus operable to clean a surface of solar panels of said at least one solar tracker row without using water;

at least two rails positioned horizontally parallel to said solar tracker row;

a support frame for supporting said at least one waterless cleaning apparatus, said support frame moving over said at least two rails and moving said at least one waterless cleaning apparatus in a width direction and a length direction of said at least one solar tracker row while maintaining a pre-determined angle in said width direction of said solar trackers;

a controller coupled with said at least one waterless cleaning apparatus and with said support frame for moving said at least one waterless cleaning apparatus in said width direction and said length direction of said at least one solar tracker row, thereby causing said at least one waterless cleaning apparatus to clean said surface of said solar panels while moving downwards in said width direction of said solar trackers;

a plurality of rail segments; and a plurality of rail switching points, wherein said at least one waterless cleaning apparatus comprises at least one air stream generating apparatus for creating a directional air stream in said width direction of said at least one solar tracker row, said directional air stream pushing dust particles from said surface of said solar panels downwards and off said solar panels of said solar trackers;

said at least one air stream generating apparatus comprising a plurality of flexible microfiber fins that move in said direction of said directional air stream and touch said surface of said solar panels to enhance a cleaning of said surface of said solar panels without using water;

wherein consecutive ones of said plurality of rail segments are respectfully coupled with consecutive ones of said at least two rails;

wherein said plurality of rail switching points are coupled between at least two of said plurality of rail segments and said at least two rails; and wherein said plurality of rail segments and said plurality of rail switching points enable said system to clean said solar panels of solar trackers in at least two solar tracker rows.

2. The system according to claim 1, wherein said at least one air stream generating apparatus comprises at least one rotatable apparatus for generating said directional air stream downwards along said surface of said solar panels of said solar trackers.

3. The system according to claim 2, wherein said plurality of flexible microfiber fins are coupled with said at least one rotatable apparatus.

4. The system according to claim 1, further comprising at least one sensor.

5. The system according to claim 4, wherein said at least one sensor is for sensing at least one parameter selected from the list consisting of:

an up position of said at least one waterless cleaning apparatus;

a position of said at least one waterless cleaning apparatus along said support frame;

a position of said support frame along said at least two rails; and an end position of said support frame.

6. The system according to claim 1, said controller further comprising:

a rechargeable battery, for powering said system; and a programmable logic controller.

7. The system according to claim 6, further comprising a solar panel, coupled with said support frame, for recharging said rechargeable battery.

8. The system according to claim 1, further comprising:

a rotating drum;

a frame, for holding said rotating drum;

at least two isolated metal cables, coupled with said at least one waterless cleaning apparatus and with said rotating drum; and a motor, coupled with said frame, for driving said rotating drum, wherein said at least two isolated metal cables wind and unwind around said rotating drum; and wherein said at least two isolated metal cables are for pulling said at least one waterless cleaning apparatus in an upwards direction along said support frame.

9. The system according to claim 1, further comprising a drive mechanism.

10. The system according to claim 9, said drive mechanism comprising:

a first pulley, coupled with a supporting pole of said supporting frame;

two wheels;

two second pulleys, coupled with said two wheels;

two belts, each respectively coupled with said pulley and with one of said two second pulleys; and a metal element, coupled with said supporting pole, for supporting said two wheels.

11. The system according to claim 1, further comprising at least two additional rails positioned horizontally perpendicular to said solar tracker row.

* * * * *